(12) United States Patent
Oya

(10) Patent No.: US 7,769,307 B2
(45) Date of Patent: Aug. 3, 2010

(54) INFORMATION PROCESSING APPARATUS AND INFORMATION PROCESSING METHOD

(75) Inventor: Takeshi Oya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 349 days.

(21) Appl. No.: 12/032,510

(22) Filed: Feb. 15, 2008

(65) Prior Publication Data

US 2008/0201374 A1 Aug. 21, 2008

(30) Foreign Application Priority Data

Feb. 19, 2007 (JP) .............................. 2007-037798

(51) Int. Cl.
*G03G 15/00* (2006.01)
*G05B 13/02* (2006.01)

(52) U.S. Cl. .............................. 399/24; 399/9; 399/25; 399/27; 399/31; 702/187; 705/28

(58) Field of Classification Search ................... 399/9, 399/24–31; 702/187; 705/28; 700/28
See application file for complete search history.

(56) References Cited

U.S. PATENT DOCUMENTS

| 5,787,320 A * | 7/1998 | Eun et al. ............... 399/59 |
| 7,158,946 B2 | 1/2007 | Sato et al. |
| 2003/0228159 A1* | 12/2003 | Tungate et al. ............. 399/27 |
| 2004/0213592 A1* | 10/2004 | Rodriguez ................ 399/24 |
| 2005/0025506 A1* | 2/2005 | Adachi ................... 399/27 |
| 2007/0081829 A1* | 4/2007 | Funayama et al. ........... 399/27 |

FOREIGN PATENT DOCUMENTS

| JP | 6-67532 A | 3/1994 |
| JP | 7-25115 A | 1/1995 |
| JP | 7-306582 A | 11/1995 |
| JP | 2001-305920 A | 11/2001 |
| JP | 2003-39783 A | 2/2003 |
| JP | 2006-343689 A | 12/2006 |

* cited by examiner

*Primary Examiner*—David P Porta
*Assistant Examiner*—Jessica L Eley
(74) *Attorney, Agent, or Firm*—Canon U.S.A., Inc., IP Division

(57) ABSTRACT

An information processing apparatus configured to monitor a status of consumables of an image forming apparatus includes a storage unit configured to store the status of the consumables of the image forming apparatus, an acquisition unit configured to acquire a consumption rate of the consumables of the image forming apparatus, a determination unit configured to determine a subsequent status of the consumables based on the status of the consumables stored in the storage unit and the consumption rate acquired by the acquisition unit. The status of the consumables includes a first status, a second status, and a third status. The second status has a remaining amount of the consumables less than the first status. When the consumables is in the third status, the determination unit does not determine that the subsequent status of the consumables is the second status if a consumption rate equals to or exceeds the first threshold.

14 Claims, 16 Drawing Sheets

FIG.3

| IDENTIFICATION NUMBER | a1234 |
|---|---|
| MODEL CODE | xyz |
| MODEL NAME | model |
| MODEL TYPE | 14 |
| IP ADDRESS | 172.22.32.133 |
| CUSTOMER CODE | AK0042301 |

FIG.4

| IDENTIFICATION NUMBER | KBD030200223 |
|---|---|
| NUMBER OF BLACK-AND-WHITE PAGES PRINTED | 89371 |
| NUMBER OF COLOR PAGES PRINTED | 29158 |
| REMAINING AMOUNT OF BLACK TONER | 89% |
| REMAINING AMOUNT OF CYAN TONER | 34% |
| REMAINING AMOUNT OF MAGENTA TONER | 9% |
| REMAINING AMOUNT OF YELLOW TONER | 3% |
| ⋮ | ⋮ |

FIG.5

| IDENTIFICATION NUMBER | KBD030200223 |
|---|---|
| LEVEL OF BLACK TONER | LEVEL 0 |
| LEVEL OF CYAN TONER | LEVEL 1 |
| LEVEL OF MAGENTA TONER | LEVEL 1 |
| LEVEL OF YELLOW TONER | LEVEL 2 |

FIG.6

| CURRENT STATUS | CONSUMPTION RATE | | SUBSEQUENT STATUS |
|---|---|---|---|
| | 80% OR MORE | 10% OR MORE | |
| LEVEL 0 | ○ | ○ | LEVEL 0 |
| LEVEL 0 | × | ○ | LEVEL 1 |
| LEVEL 0 | × | × | LEVEL 0 |
| LEVEL 1 | ○ | ○ | LEVEL 1 |
| LEVEL 1 | × | ○ | LEVEL 1 |
| LEVEL 1 | × | × | LEVEL 2 |
| LEVEL 2 | ○ | ○ | LEVEL 0 |
| LEVEL 2 | × | ○ | LEVEL 2 |
| LEVEL 2 | × | × | LEVEL 2 |

FIG.7

| IDENTIFICATION NUMBER | a1234 |
|---|---|
| TONER | toner@service.co.jp |
| PARTS | parts@service.co.jp |
| GLUE | consumption@service.co.jp |
| STAPLE | consumption@service.co.jp |

FIG.12

| | |
|---|---|
| IDENTIFICATION NUMBER | a1234 |
| LEVEL OF BLACK TONER | LEVEL 0 |
| LEVEL OF CYAN TONER | LEVEL 1 |
| LEVEL OF MAGENTA TONER | LEVEL 1 |
| LEVEL OF YELLOW TONER | LEVEL 2 |
| TEMPORARY LEVEL OF BLACK TONER | LEVEL 0 |
| TEMPORARY LEVEL OF CYAN TONER | LEVEL 2 |
| TEMPORARY LEVEL OF MAGENTA TONER | LEVEL 2 |
| TEMPORARY LEVEL OF YELLOW TONER | LEVEL 2 |
| BLACK TONER LEVEL COUNTER | 3 |
| CYAN TONER LEVEL COUNTER | 1 |
| MAGENTA TONER LEVEL COUNTER | 2 |
| YELLOW TONER LEVEL COUNTER | 1 |

FIG.14

| | |
|---|---|
| IDENTIFICATION NUMBER | a1234 |
| NUMBER OF BLACK-AND-WHITE PAGES PRINTED | 89371 |
| NUMBER OF COLOR PAGES PRINTED | 29158 |
| WARNING [1] | MAGENTA TONER LOW |
| WARNING [2] | YELLOW TONER LOW |
| WARNING [3] | NO STAPLE |
| BLACK TONER THRESHOLD VALUE | 11% |
| CYAN TONER THRESHOLD VALUE | — |
| MAGENTA TONER THRESHOLD VALUE | 16% |
| YELLOW TONER THRESHOLD VALUE | 15% |
| REMAINING AMOUNT OF BLACK TONER | 89% |
| REMAINING AMOUNT OF CYAN TONER | 34% |
| REMAINING AMOUNT OF MAGENTA TONER | 16% |
| REMAINING AMOUNT OF YELLOW TONER | 11% |
| ⋮ | ⋮ |

FIG.15

| CURRENT STATUS | CONSUMPTION RATES | | SUBSEQUENT STATUS |
|---|---|---|---|
| | 100-THRESHOLD | THRESHOLD | |
| LEVEL 0 | ○ | ○ | LEVEL 0 |
| LEVEL 0 | × | ○ | LEVEL 1 |
| LEVEL 0 | × | × | LEVEL 0 |
| LEVEL 1 | ○ | ○ | LEVEL 1 |
| LEVEL 1 | × | ○ | LEVEL 1 |
| LEVEL 1 | × | × | LEVEL 2 |
| LEVEL 2 | ○ | ○ | LEVEL 0 |
| LEVEL 2 | × | ○ | LEVEL 2 |
| LEVEL 2 | × | × | LEVEL 2 |

INFORMATION PROCESSING APPARATUS AND INFORMATION PROCESSING METHOD

BACKGROUND OF THE INVENTION

1. Field of the Invention

The present invention relates to an information processing apparatus such as an image forming apparatus, a monitor apparatus, and a monitoring system, which are configured to detect and control replacement or replenishment of consumables of the image forming apparatus.

2. Description of the Related Art

Conventionally, when consumables of an image forming apparatus are worn out or a remaining amount of the consumables becomes small, the consumables are replaced or replenished. In this case, inventory control of the consumables for replacement or replenishment is important in reducing downtime of the image forming apparatus. Therefore, methods are discussed to detect whether the remaining amount of the consumables is small or to see whether the consumables are replaced or replenished.

Japanese Patent Application Laid-Open No. 2003-39783 discusses a method in which an identification (ID) tag is attached to replacement or replenishment parts. An image forming apparatus checks the ID on a regular or occasional basis to see whether the ID is changed. In this way, the replacement or replenishment of the parts is detected. Although this is an appropriate method for detecting replacement, each part requires attachment of an ID tag, and further, an apparatus used for reading the ID has to be implemented in the apparatus main body. Accordingly, the cost of the main body and the parts is increased.

Japanese Patent Application Laid-Open No. 6-67532 and Japanese Patent Application Laid-Open No. 7-306582 discuss a method in which a switch is provided at a place where a replacement or replenishment part is installed. According to this switch, the replacement or replenishment part is detected when it is removed or attached, and therefore can be recognized to be replaced or replenished. However, according to this method, when the switch is turned on in a case other than replacement or replenishment, false detection may occur and detection accuracy will be significantly degraded. In a case of a toner cartridge unit for example, a cartridge is removed and shaken when toner level is low or removed when a paper jam occurs. Similarly, when a roller of a feeding roller unit runs idly, the roller is removed and reset after it is cleaned.

Further, Japanese Patent Application Laid-Open No. 7-25115 and Japanese Patent Application Laid-Open No. 2001-305920 discuss a method in which replacement or replenishment is detected based on a status of the image forming apparatus and a number of pages that have been printed. If a status indicating a replacement or replenishment time of the consumables is displayed, the consumables are regarded as replaced or replenished.

In this case, on a border of the detection, the status may or may not appear. For this reason, once the status appears, the status is ignored for a certain period of time. For example, a number of pages which are printed at a time the status appears or disappears is stored and the status is not referred to until a certain number of pages is printed. According to this processing, a status which appears or disappears when the remaining amount of toner is small can be ignored until the replacement or replenishment is made so that detection error can be avoided. Further, a detection error which occurs when the cartridge is removed, shaken, and reset to temporarily suspend the toner low level, can be prevented.

However, according to the method discussed in Japanese Patent Application Laid-Open No. 7-25115 and Japanese Patent Application Laid-Open No. 2001-305920, when the toner level exceeds a predetermined threshold, a detection error occurs. It is therefore difficult to improve accuracy in detection while dealing with various situations.

For example, if toner in an image forming apparatus becomes empty when 300 pages are printed after a toner low occurs, a threshold of 1000 pages may be defined. In this case, although the toner low level is properly detected in normal use, if a print which requires only little toner is made, 1200 pages can be printed after the toner low sign appears. However, at the point 1000 pages are printed, toner low is detected again if the apparatus continues to be used without replacing the toner cartridge.

On the other hand, a detection error also occurs when making a print which consumes a large amount of toner. If a user supplies toner immediately after the toner low sign appears, and then makes a print which consumes ten times the amount of toner than a usual print, then toner low appears before 1000 pages are printed. Since this toner low is ignored, the case ends in a detection error. In order to avoid such a detection error, thresholds that can meet various situations need to be prepared. For example, an amount of toner consumed in making a print has to be determined, which makes the system complex.

As a result, conventional techniques require an expensive and special system such as an ID reading apparatus. Otherwise, appropriate control of the consumables becomes difficult when the consumables are replaced or replenished at the time the remaining amount of the consumables becomes small.

SUMMARY OF THE INVENTION

The present invention is directed to a method for performing an appropriate management of consumables without using an expensive special system.

According to an aspect of the present invention, an information processing apparatus configured to monitor a status of consumables of an image forming apparatus includes a storage unit configured to store the status of the consumables of the image forming apparatus, an acquisition unit configured to acquire a consumption rate of the consumables of the image forming apparatus, a determination unit configured to determine a subsequent status of the consumables based on the status of the consumables stored in the storage unit and the consumption rate acquired by the acquisition unit, wherein the status of the consumables includes a first status, a second status, and a third status, wherein the second status has a remaining amount of the consumables less than the first status and the third status has a remaining amount of consumables less than the second status, a notification unit configured to notify that the remaining amount of the consumables is low when the subsequent status of the consumables is determined to be the third status by the determination unit, a replacement notification unit configured to notify that the consumables have been replaced when the subsequent status of the consumables is determined to be the first status by the determination unit, wherein when the status of the consumables stored in the storage unit is the third status, the determination unit determines that the subsequent status of the consumables is the first status if the consumption rate acquired by the acquisition unit is greater than or equal to a second threshold, and determines that the subsequent status of the consumables is not the second status but the third status if a consumption rate acquired by the acquisition unit is greater than or equal to the first threshold but less than the second threshold.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates an example of information managed and stored in an apparatus management data storage unit according to the first exemplary embodiment of the present invention.

FIG. 4 illustrates an example of information managed and stored in an apparatus status data storage unit according to the first exemplary embodiment of the present invention.

FIG. 5 illustrates an example of information managed and stored in a consumables status data storage unit according to the first exemplary embodiment of the present invention.

FIG. 6 illustrates an example of information managed and stored in a subsequent status table according to the first exemplary embodiment of the present invention.

FIG. 7 illustrates an example of information managed and stored in a notification destination information storage unit according to the first exemplary embodiment of the present invention.

FIG. 12 illustrates an example of information managed and stored in a consumables status data storage unit according to a second exemplary embodiment of the present invention.

FIG. 14 illustrates an example of information managed and stored in an apparatus status data storage unit according to a third exemplary embodiment of the present invention.

FIG. 15 illustrates an example of information managed and stored in a subsequent status table according to the third exemplary embodiment of the present invention.

DETAILED DESCRIPTION OF THE EMBODIMENTS

Various exemplary embodiments, features, and aspects of the invention will be described in detail below with reference to the drawings.

Figure 11:
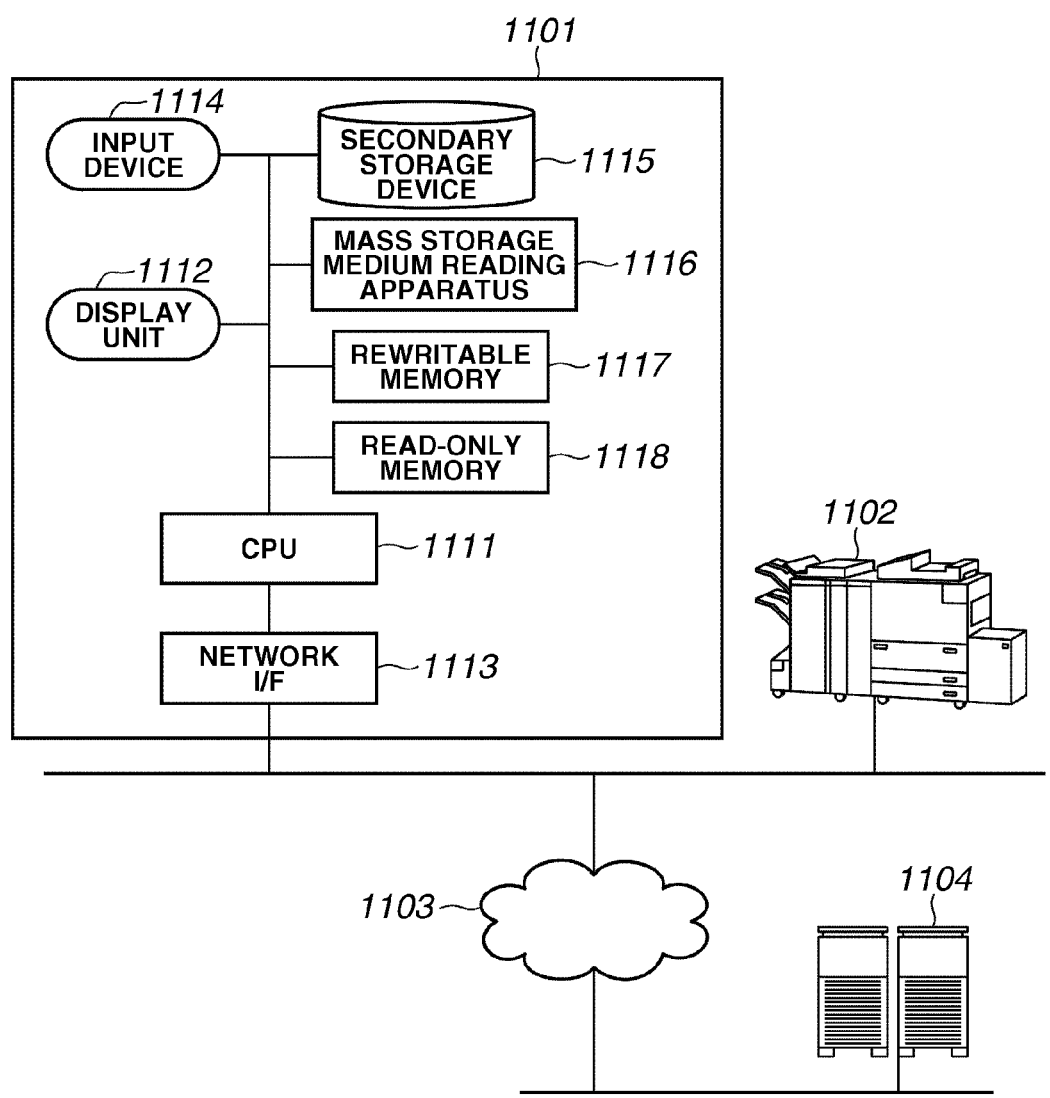
FIG. 11 illustrates a system configuration according to the first exemplary embodiment of the present invention.

FIG. 11 illustrates a system configuration according to a first exemplary embodiment of the present invention. A monitor apparatus 1101 is an information processing apparatus and an image forming apparatus 1102 is an apparatus which is monitored. The system includes only one image forming apparatus 1102 according to the present exemplary embodiment, however, a plurality of the image forming apparatuses 1102 may be included in the system and monitored by the monitor apparatus 1101.

The monitor apparatus 1101 and the image forming apparatus 1102 are connected to a network and communicate with a server 1104 via an Internet 1103. Communication between the monitor apparatus 1101 and the server 1104 may not necessarily be direct and may be achieved by, for example, mail forwarding through a relay server or the like. A function of the monitor apparatus 1101 may be implemented in the image forming apparatus 1102, and the image forming apparatus 1102 may monitor a status of itself. The monitoring system according to the present embodiment has the above-mentioned network configuration.

A hardware configuration of the monitor apparatus 1101 will now be described. A central processing unit (CPU) 1111 executes various control programs and controls the entire monitor apparatus 1101. A display unit 1112 is, for example, a cathode ray tube (CRT) display. Image and text data are displayed on the display unit 1112. The monitor apparatus 1101 is connected to the Internet 1103 through a network interface 1113. The monitor apparatus 1101 also includes an input device 1114 such as a keyboard or a mouse and a secondary storage device 1115 such as a floppy disk drive or a hard disk drive. Further the monitor apparatus 1101 includes a mass storage medium reading apparatus 1116 such as a compact disc (CD) drive or a digital versatile disk (DVD) drive, a rewritable (RW) memory 1117, for example, a read only memory (ROM) or a random access memory (RAM), and further, a read-only (RO) memory 1118. According to the present embodiment, a control program configured to realize various processing, as described below, is stored in the above-mentioned storage device or memory.

Figure 1:
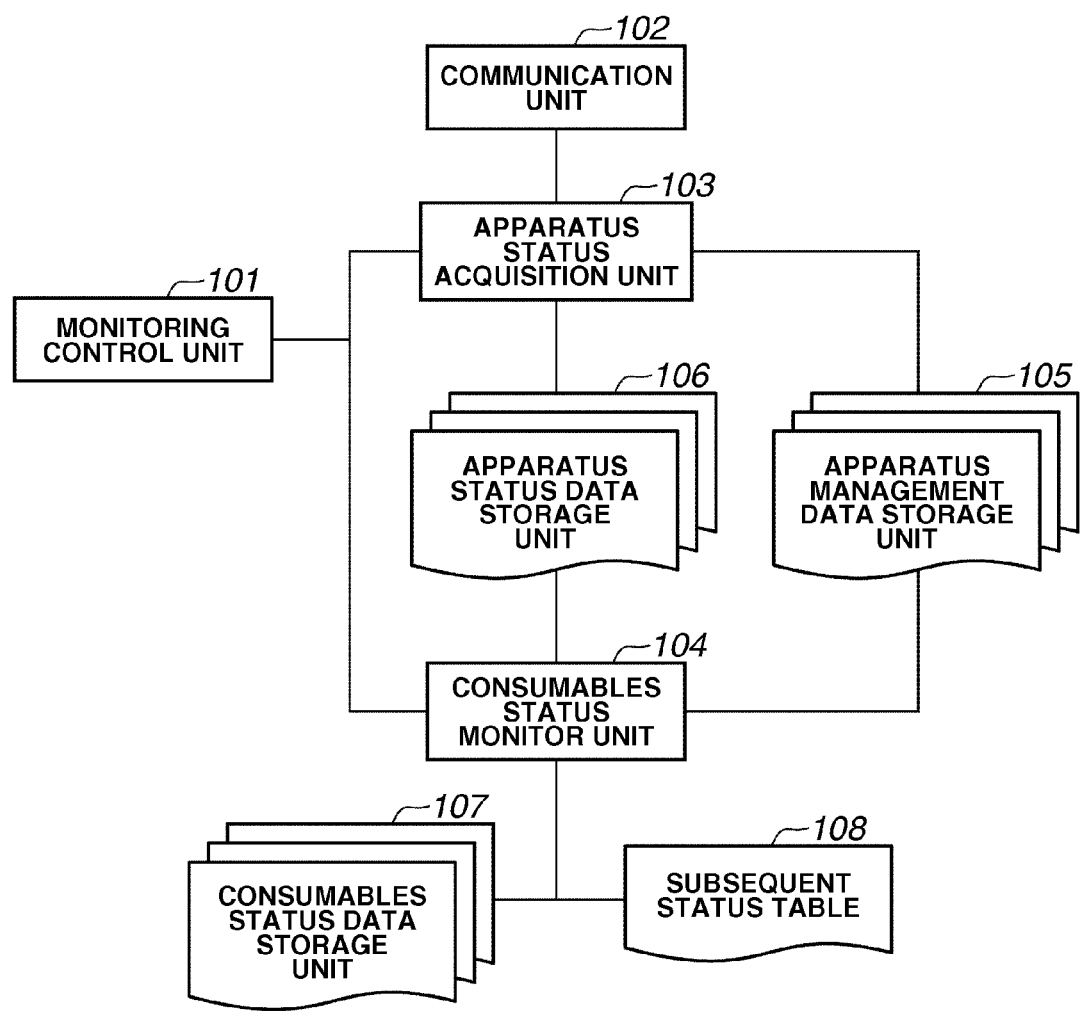
FIG. 1 illustrates a main module configuration of a monitor apparatus according to a first exemplary embodiment of the present invention.
Figure 2:
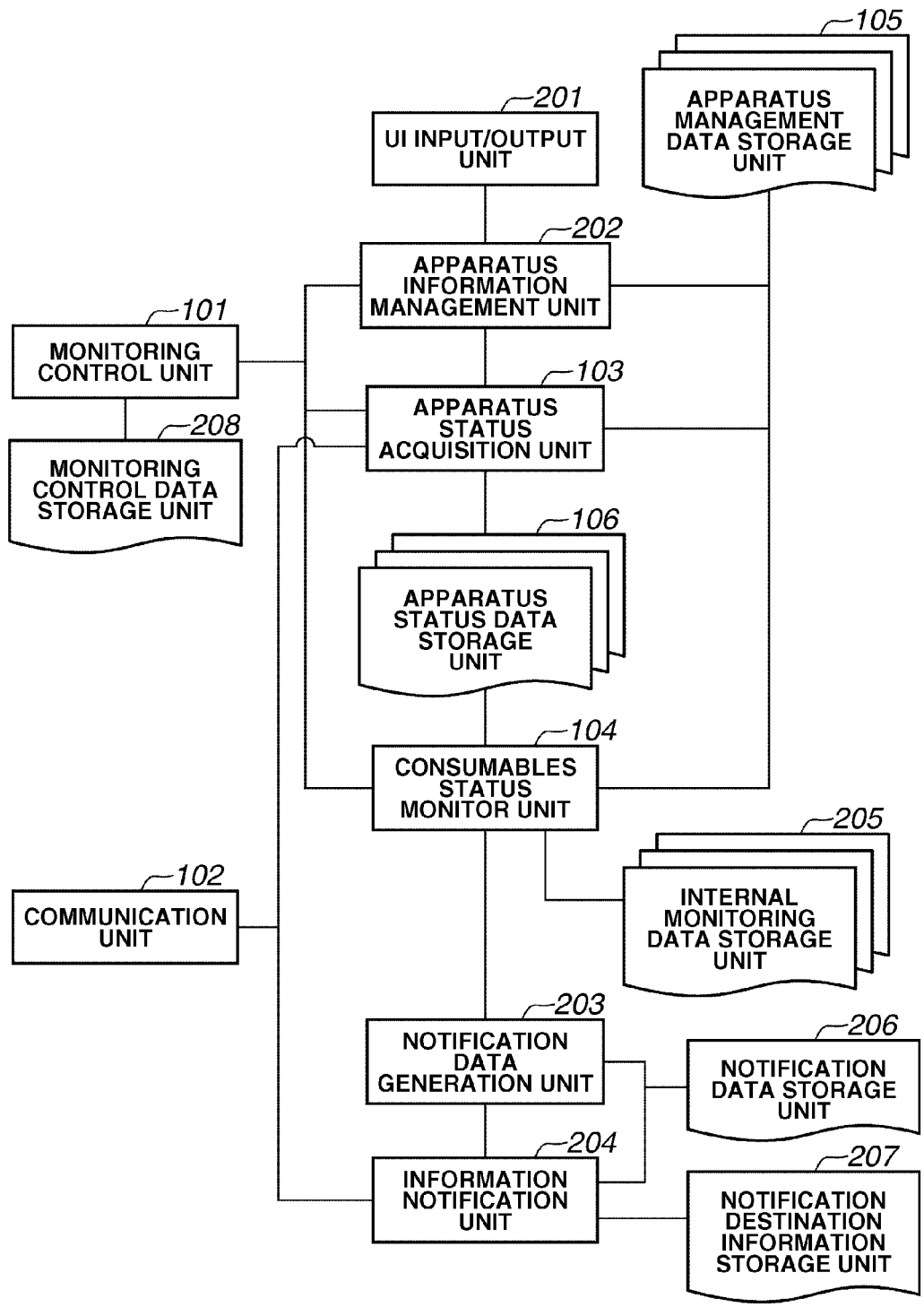
FIG. 2 illustrates a module configuration of the monitor apparatus according to the first exemplary embodiment of the present invention.

FIG. 2 illustrates a module configuration of the monitor apparatus 1101. FIG. 1 illustrates a main module configuration of the monitor apparatus 1101 according to the present embodiment.

A monitoring control unit 101 is configured to monitor a status consumables. A communication unit 102 is used when the monitor apparatus 1101 communicates with the image forming apparatus 1102 or the server 1104. An apparatus status acquisition unit 103 is configured to acquire a status from the image forming apparatus 1102. A consumables status monitor unit 104 is configured to determine a status of the consumables based on information acquired from the apparatus status acquisition unit 103.

An apparatus management data storage unit 105 is configured to store apparatus management data which is information about the image forming apparatus 1102 managed by the image forming apparatus 1102. An apparatus status data storage unit 106 is configured to store status data of each apparatus acquired by the apparatus status acquisition unit 103. A consumables status data storage unit 107 is configured to store consumables status data for each apparatus which stores the status determined by the consumables status monitor unit

104. A subsequent status table 108 is a table which the consumables status monitor unit 104 uses in making a determination.

A user interface (UI) input/output unit 201 is configured to register, edit, or delete the image forming apparatus which is monitored by the image forming apparatus 1102. An apparatus information management unit 202 reads or writes data to or from the apparatus management data storage unit 105 according to the operation in the UI input/output unit 201. Further, the apparatus information management unit 202 notifies the monitoring control unit 101 in order to exclusively control operation of the apparatus management data storage unit 105 according to the operation in the UI input/output unit 201. A notification data generation unit 203 is configured to generate notification data when information which is to be notified appears.

An information notification unit 204 is configured to provide the notification data. The information notification unit 204 sends the notification data to the server 1104 through the communication unit 102. An internal monitoring data storage unit 205 is configured to store internal monitoring data used by the consumables status monitor unit 104 and includes, as its part, the consumables status data storage unit 107 and the subsequent status table 108. A notification data storage unit 206 is configured to store the notification data generated by the notification data generation unit 203. A notification destination information storage unit 207 is configured to store notification destination information referred to by the information notification unit 204. A monitoring control data storage unit 208 is configured to store monitoring control data necessary in controlling operation of the monitor apparatus 1101.

Each of FIGS. 3 to 7 illustrates an example of information managed and stored in the apparatus management data storage unit 105, the apparatus status data storage unit 106, the consumables status data storage unit 107, the subsequent status table 108, and the notification destination information storage unit 207.

FIG. 3 illustrates information stored in the apparatus management data storage unit 105. The information includes a unique identification number of the image forming apparatus, a model code of the image forming apparatus, a model name such as a product name, and a model type which is used in internal processing of the image forming apparatus 1102. In addition, the apparatus management data storage unit 105 includes an IP address and a customer code used for viewing customer information. The information stored in the apparatus management data storage unit 105 is apparatus information about the image forming apparatus 1102 which is monitored by the monitor apparatus 1101. When a plurality of image forming apparatuses are monitored, a number of pieces of apparatus information corresponds to a number of the image forming apparatuses.

Information stored in the apparatus status data storage unit 106 illustrated in FIG. 4 includes information such as identification number, the number of black-and-white pages that has been printed, the number of color pages that has been printed, and remaining amount of toner of each color at a point of time when the monitor apparatus 1101 collects such information from the image forming apparatus 1102. The information is collected by the apparatus status data storage unit 106 at regular intervals. The information stored in the apparatus status data storage unit 106 is status information about the image forming apparatus 1102 which is monitored by the monitor apparatus 1101. When a plurality of image forming apparatuses are monitored, a number of pieces of status information corresponds to a number of the image forming apparatuses.

FIG. 5 illustrates information stored in the consumables status data storage unit 107. The information that the consumables status data storage unit 107 holds includes the identification number of the image forming apparatus monitored by the monitor apparatus 1101 and consumables status information determined by the consumables status monitor unit 104. When a plurality of image forming apparatuses are monitored, a number of pieces of consumables status information also corresponds to a number of the image forming apparatuses, similar to the apparatus management data storage unit 105.

The subsequent status table 108 illustrated in FIG. 6 includes information used in determining a subsequent status according to information about toner amount acquired from the image forming apparatus 1102 which is monitored. The information in the subsequent status table 108 indicates a condition for change when the consumables status of the image forming apparatus 1102 stored in the consumables status data storage unit 107 of the monitor apparatus 1101 is changed from the current status to the subsequent status. Although the information in the subsequent status table 108 is represented in a table format, it is actually recorded in a script file or in a rule-based description so that the consumables status monitor unit 104 can use the information in making determination. A status level is indicated by "LEVEL" in FIG. 6.

In FIG. 6, two thresholds are set for determining a change of three statuses of the consumables. A first threshold is 10% and a second threshold is 80%. The change of the consumables status is determined by detecting whether the acquired consumption rate is above or below the threshold. The present invention is not limited to the number of thresholds or the threshold values described above, and any number opf thresholds and any threshold values that would enable practice of the present invention are applicable.

Consumables information acquired by the monitor apparatus 111 (consumption rate in the present embodiment) is determined based on a condition entered in the "acquired consumption rate" field. For example, if the acquired level of the consumables is 90%, then the status of the consumables corresponds to the row showing YES in both the "80% or more" column and the "10% or more" column. If the acquired level of the consumables is 20%, then the status of the consumables corresponds to the row showing NO in the "80% or more" column and YES in the "10% or more" column.

A subsequent status of the monitoring status is entered in a "subsequent status" field. The subsequent status is a status subsequent to the current status. The subsequent status is determined according to the current status which is a status of the image forming apparatus 1102 determined by the monitor apparatus 1101 and a determination result of the consumption rate. For example, if the current consumables determination result is level 0 and the acquired consumption rate is 20%, then the subsequent status will be level 1. In the present embodiment, the consumables status of the image forming apparatus 1102 monitored by the monitor apparatus 1101 is classified into three levels: level 0, 1, and 2. Level 2 is a status where the remaining amount of the consumables is small or there is no amount left. Level 2 indicates a status such as toner low, in which a service person or an administrator is notified to replace the consumables. Level 0 is a status after the consumables are replaced, such as toner full (i.e., enough amount of consumables).

In the subsequent status table 108, the toner level is shifted only to a subsequent lower level, except for the case of level 2, according to the present embodiment. Level 2 is a level set for the lowest remaining amount of toner. Level 2 is shifted only to the highest remaining amount of toner, which is level 0 in the present embodiment, at the time the toner is replaced or replenished.

Further, except when the level is shifted under the aforementioned condition, the current level is kept unchanged independent of the acquired consumption rate. In other words, the level will never be changed to the previous level regardless of the acquired consumption rate at each stage. For example, a toner low may be temporarily cleared by shaking the toner bottle and resetting it. In such a case, however, if a system works in a way such that a service person is to be automatically sent to deliver and replenish toner, the toner may be delivered a number of times for one toner low phenomenon.

According to the condition described in FIG. 6, however, level 2 is not changed to level 0 unless a toner full status is acquired. The toner full status is where the level of the toner is 80% or more, which shows that the toner is replenished. Thus, such a problem can be solved.

The notification destination information storage unit 207 illustrated in FIG. 7 stores an identification number of the image forming apparatus which is monitored and a notification address of a service person who is notified to replace or replenish each of the monitored consumables. According to the present embodiment, an e-mail address is used as the notification address since e-mail is used for notification. However, the notification destination information storage unit 207 can store the communication destination information according to a communication medium when other communication means is employed.

Figure 8:
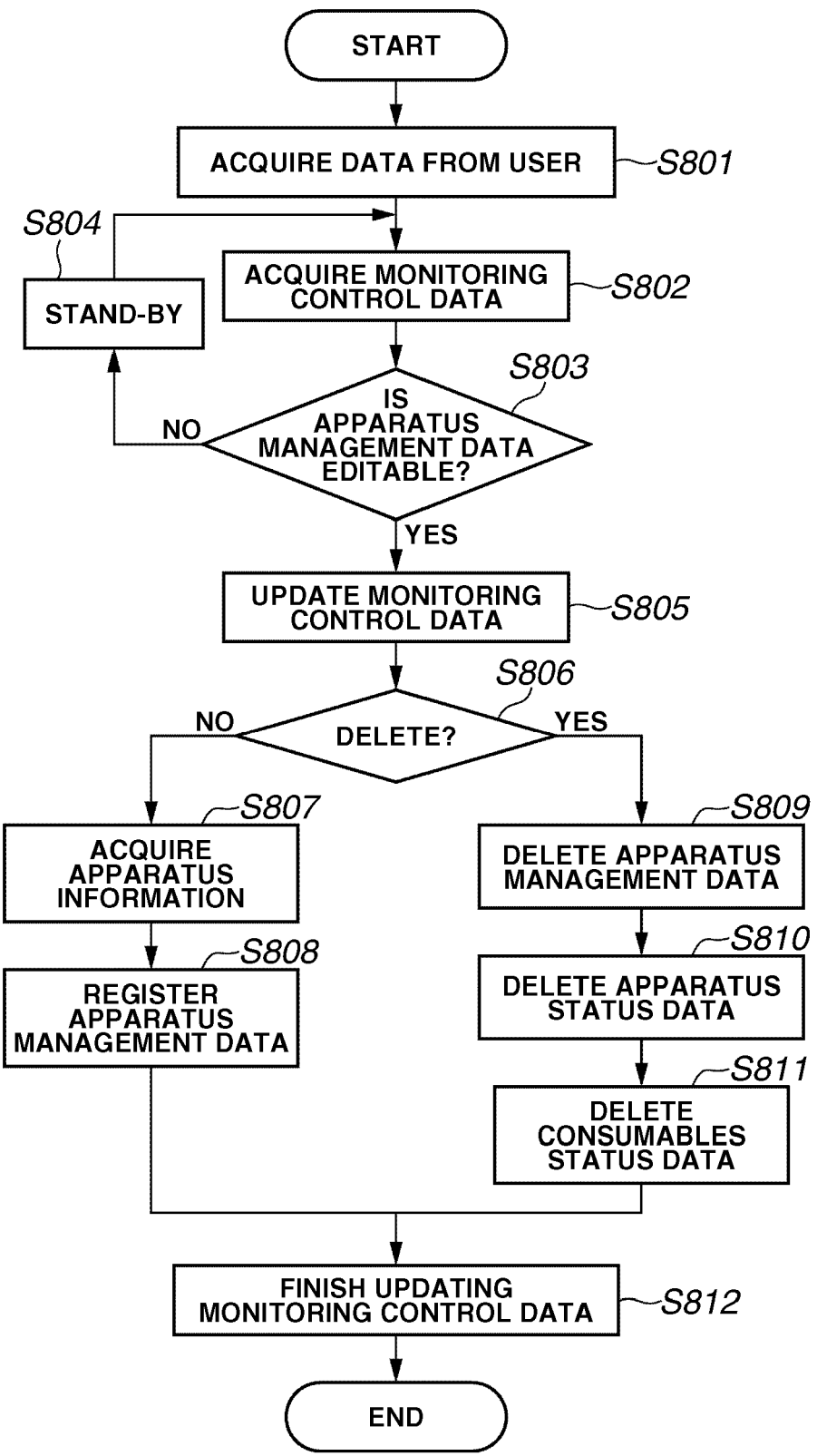
FIG. 8 is a flowchart illustrating a control program configured to edit apparatus information according to the first exemplary embodiment of the present invention.
Figure 9:
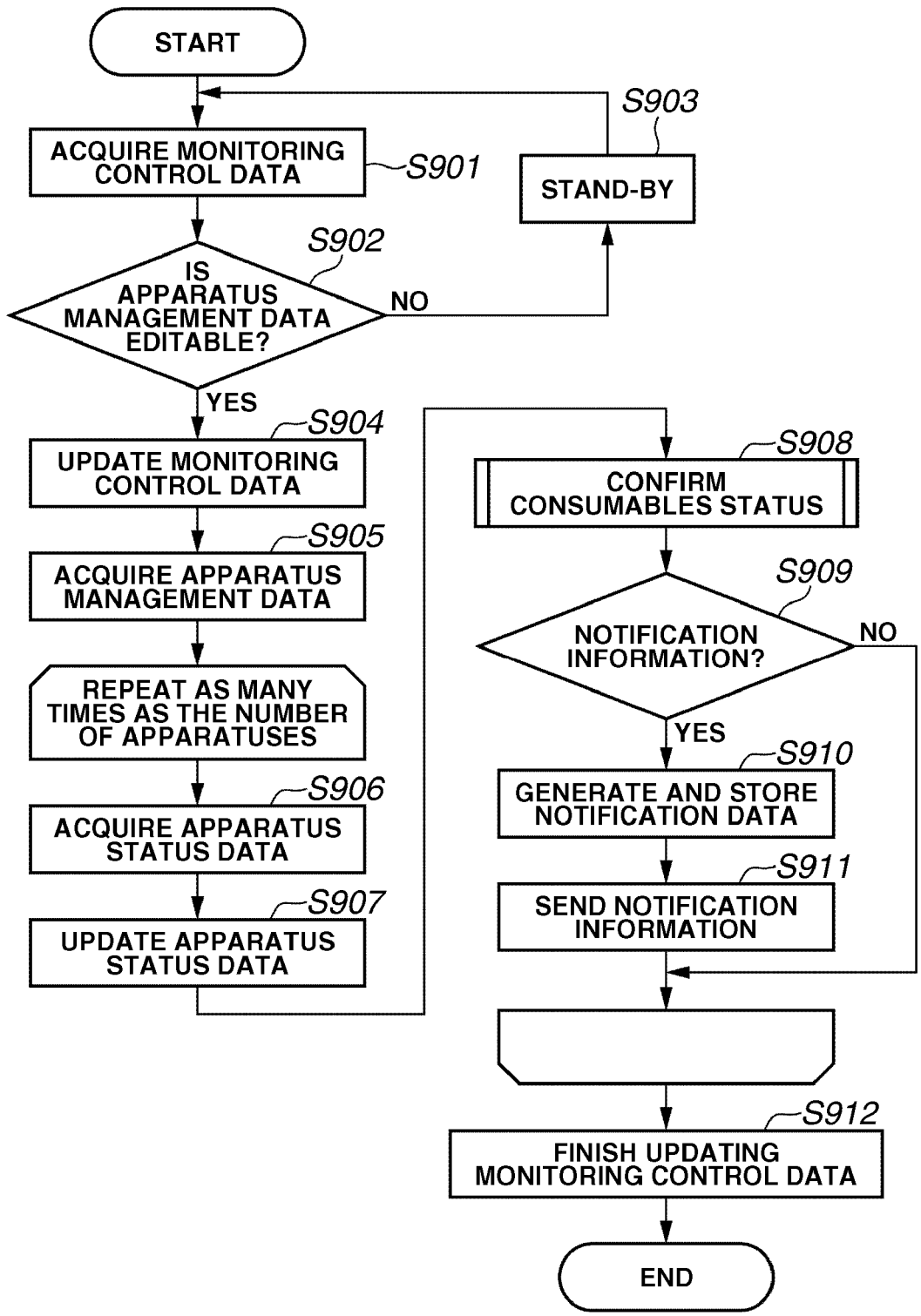
FIG. 9 is a flowchart illustrating a control program configured to realize apparatus monitoring processing for monitoring a status of consumables according to the first exemplary embodiment of the present invention.
Figure 10:
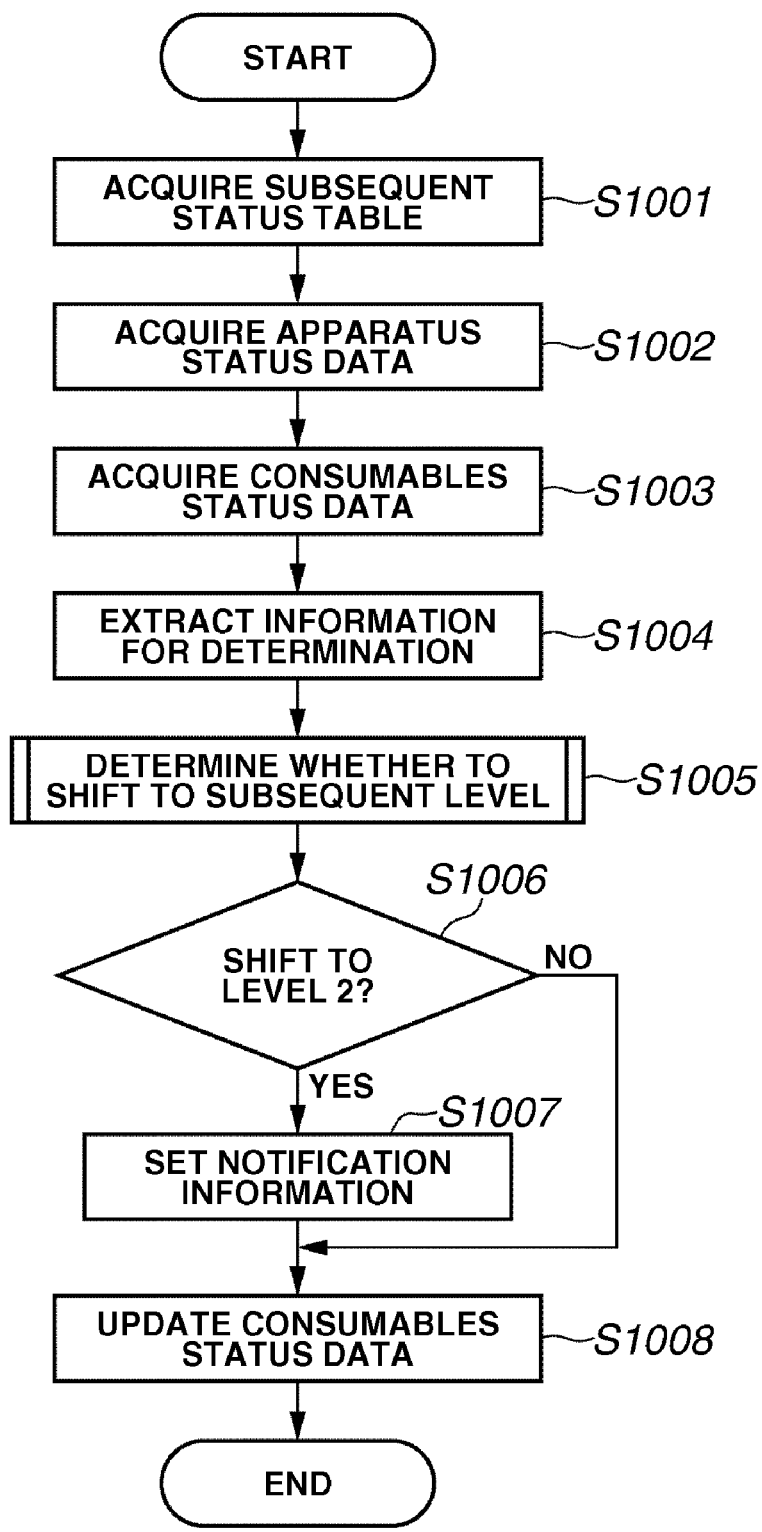
FIG. 10 is a flowchart illustrating a control program configured to confirm a consumables status according to the first exemplary embodiment of the present invention.

FIGS. 8, 9, and 10 are flowcharts illustrating a control program configured to process consumables management executed by the monitor apparatus 1101 according to the present embodiment.

FIG. 8 is a flowchart illustrating a control program configured to realize edit processing of the apparatus information.

In step S801, the apparatus status acquisition unit 103 acquires data input by the user. The data includes an IP address of the image forming apparatus, a customer code, and information on whether the processing is registration, editing, or deletion.

In step S802, the apparatus status acquisition unit 103 inquires the monitoring control unit 101 about the apparatus management data of the image forming apparatus which is specified by the information acquired in step S801, and the monitoring control unit 101 acquires monitoring control data from the monitoring control data storage unit 208. Instep S803, the monitoring control unit 101 determines whether the apparatus management data is not used in other processing and thus editable. If the apparatus management data is being used (NO in step S803), then in step S804, the monitoring control unit 101 does not edit the apparatus management data and stands by. If the apparatus management data is not being used (YES in step S803), then in step S805, the monitoring control unit 101 registers that the apparatus management data is being used by the monitoring control data storage unit 208 as monitoring control data. Accordingly, the apparatus management data cannot be used until the editing of the apparatus management data is finished.

In step S806, the monitoring control unit 101 determines whether the processing is deleting, based on the data input by the user.

If the processing content specified by the information acquired in step S801 is registration or update processing (NO in step S806), then in step S807, the monitoring control unit 101 collects and acquires the apparatus information such as identification number and model type from the specified image forming apparatus. In step S808, the monitoring control unit 101 registers or updates apparatus management data which is stored in the apparatus management data storage unit 105. The apparatus management data corresponds to the acquired apparatus information.

If the processing content acquired in step S801 is deletion processing (YES in step S806), then in step S809, the monitoring control unit 101 deletes the management data of the image forming apparatus that is specified by the information acquired in step S801 from the apparatus management data storage unit 105. Further, in step S810, the consumables status monitor unit 104 deletes the apparatus status data from the apparatus status data storage unit 106. Furthermore, in step S811, the consumables status monitor unit 104 deletes consumables status data from the consumables status data storage unit 107. According to steps S809 to S811, the apparatus information of the image forming apparatus specified in step S801 is deleted.

In step S812, the monitoring control unit 101 registers that the apparatus management data is no longer in use in the monitoring control data storage unit 208 and updates the monitoring control data, and the editing process of the apparatus information ends.

FIG. 9 is a flowchart illustrating a control program configured to realize apparatus monitoring processing which monitors a status of the consumables.

According to the apparatus monitoring processing, the processing by the consumables status monitor unit 104 is started at regular intervals. The consumables status monitor unit 104 inquires the monitoring control unit 101 about the operation status.

In step S901, the monitoring control unit 101 refers to the monitoring control data storage unit 208 and acquires the monitoring control data. In step S902, the monitoring control unit 101 determines whether the apparatus management data is not used in other processing and thus editable. If the apparatus management data is being used (NO in step S902), then in step S903, the monitoring control unit 101 does not edit the apparatus management data and stands by. If the apparatus management data is not being used (YES in step S902), then in step S904, the monitoring control unit 101 registers that the apparatus management data is being used and updates monitoring control data in the monitoring control data storage unit 208. In step S905, the consumables status monitor unit 104 acquires the apparatus management data from the apparatus management data storage unit 105.

Steps S905 to S911 are repeated as many times as the number of image forming apparatuses monitored by the monitor apparatus 1101. Accordingly, processing of consumables of all image forming apparatuses which are to be monitored is performed.

In step S906, the consumables status monitor unit 104 instructs the apparatus status acquisition unit 103 to acquire apparatus status data, and the apparatus status acquisition unit 103 acquires the apparatus status information from the image forming apparatus. Then in step S907, the apparatus status acquisition unit 103 records the apparatus status data based on the acquired status information in the apparatus status data storage unit 106 and updates the apparatus status data. If the apparatus status data is unchanged, it is not updated.

Next, in step S908, the monitoring control unit 101 confirms the consumables status. This process is described below with respect to FIG. 10.

In step S909, if notification information is found as a result of the confirmation processing of the consumables status (YES in step S909), then in step S910, the notification data generation unit 203 generates notification data and stores the notification data in the notification data storage unit 206.

In step S911, the information notification unit 204 accesses the notification destination information storage unit 207 using the identification number and consumables type described in the notification information stored in the notification data storage unit 206 and determines a destination of the notification information. The information notification unit 204 sends the notification information stored in the notification data storage unit 206 to the determined destination.

In step S912, the monitoring control unit 101 registers that acquisition of apparatus information about all image forming apparatuses that are monitoring targets is completed in the control data storage unit 208 and the process ends.

FIG. 10 is a flowchart of a control program configured to confirm a consumables status.

In step S1001, the monitoring control unit 101 acquires the subsequent status table 108 which is used for determining whether to change to the subsequent status.

In step S1002, the monitoring control unit 101 acquires the apparatus status data which is recorded in step S907. Next, in step S1003, the monitoring control unit 101 acquires consumables status data which is previously acquired In step S1004, the monitoring control unit 101 acquires information about each color to determine the remaining toner amount of each color. In step S1005, the monitoring control unit 101 determines whether the status is to be changed to the subsequent status based on the information acquired in step S1001.

For example, the remaining amount of black toner in FIGS. 4 and 5 is 89% and the level of toner which is checked last time is level 0. Based on such information and the subsequent status table 108 illustrated in FIG. 6, the consumable status of the black toner is determined as level 0 and the status is not changed. Similarly, the cyan toner is determined to be level 1 and the status is not changed. The magenta toner is determined to change from level 1 to level 2. The yellow toner is determined to be level 2 and the status is not changed.

In step S1006, if the level is changed to level 2 (YES in step S1006) according to the determination made by the monitoring control unit 101, then in step S1007, the monitoring control unit 101 determines that the notification is to be sent and sends the notification information to the notification data generation unit 203. According to FIGS. 4, 5, and 6, notification information about the magenta toner that the remaining amount of magenta toner is low, is generated. Although the yellow toner keeps level 2, notification information may be generated and sent to the notification data generation unit 203 together with information about the number of times such information is sent. The number of times is provided to explicitly inform the administrator or the service person that the notification is the same warning as the previous time.

Next, in step S1008, the monitoring control unit 101 records the determined status in the consumables status data storage unit 107. According to the present embodiment, the current status level is determined according to the previous consumables status level and the apparatus status information received this time. Notification of the consumables status is made based on the determination result.

For example, toner low may be temporarily cleared by shaking the toner bottle and resetting the toner bottle. In such a case, if a system works in a way such that the service person is automatically called to deliver and replenish toner, the notification may be sent twice for one toner low.

However, according to the present embodiment, once the level is changed to level 2, the level is not changed to level 0 unless a toner full status is acquired owing to replacement or replenishment. Thus, the above-described false notification can be avoided and the notification will not be sent twice for one toner low.

Although the notification is made in step S1006 in the present embodiment, it is not limited to step S1006, and the processing result may be notified upon a request for a current status from an administrator or a service person. Further, the status may be continuously displayed on a display unit of the monitor apparatus, and the screen may be changed when information which needs to be notified is generated or when a change in the status occurs, and notification information is sent by e-mail at the same time.

Furthermore, the notification may be sent when the subsequent status of the consumables is determined as toner low or toner full.

According to the first exemplary embodiment, in a model which notifies toner full during calibration, a level is changed from level 2 to level 0 when the calibration operation ends at level 2 (i.e., a toner amount is less than 10%).

However, even if the remaining amount of toner returns to less than 10% after the calibration, since the level is not changed to level 2 according to a determination of the consumables status monitor unit 104, false detection can be prevented. However, in a case where the toner level does not immediately return to less than 10% after the calibration but lowers in stages, for example, by 10% each second due to a remaining amount detection structure, the toner level may be determined as level 1 and result in false detection. The present embodiment addresses this issue.

According to the present embodiment, consumables data illustrated in FIG. 12 is stored in the consumables status data storage unit 107. The previous toner level determined by the consumables status monitor unit 104, which is similar to the level illustrated in FIG. 5, is a temporary level of status of the consumables (temporary level) that is temporarily stored. Further, a number of renewing times of the temporary level (a level counter) which is used as a counter in determining the level, is stored in the consumables status data storage unit 107.

Figure 13:
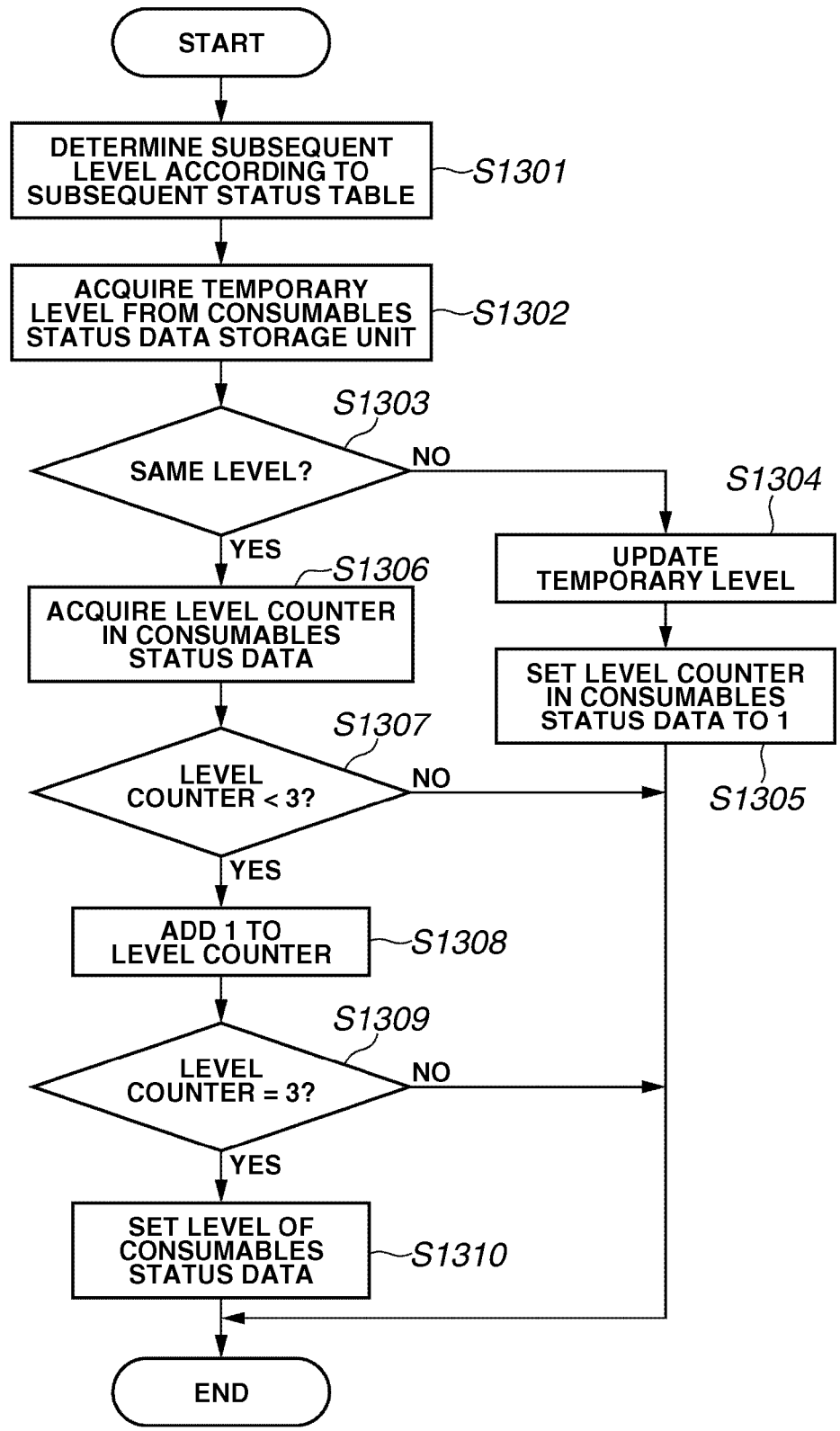
FIG. 13 is a determination flowchart based on a control program configured to realize subsequent status determination processing according to the second exemplary embodiment of the present invention.

FIG. 13 is a determination flowchart based on a control program configured to realize subsequent status determination processing according to the present embodiment. The apparatus editing processing, etc. is similar to the processing described in FIGS. 8, 9, and 10. The subsequent status determination processing, which is step S1005 in FIG. 10, is a feature of the present embodiment.

After step S1004 in FIG. 10, determination processing of the subsequent status is started in step S1005.

In step S1301, the monitoring control unit 101 determines a subsequent status level based on the preceding toner level and the current status (remaining amount) of the toner using the subsequent status table 108. In step S1302, the monitoring control unit 101 acquires a temporary level from the consumables status data storage unit 107.

In step S1303, the monitoring control unit 101 compares the levels acquired in steps S1301 and S1302 and determines whether the levels are the same. If the levels are not the same (NO in step S1303), then in step S1304, the monitoring control unit 101 sets the subsequent status level which is determined this time as a temporary level, and updates the consumables status data in the consumables status data storage unit 107. In step S1305, the monitoring control unit 101 sets the level counter to 1.

If the levels are the same (YES in step S1303), then in step S1306, the monitoring control unit 101 acquires the level counter from the consumables status data storage unit 107. In step S1307, the monitoring control unit 101 determines whether the acquired value of the level counter is less than 3. If the value of the level counter is greater than 3 (NO in step S1307), the determination processing of the subsequent status ends. If the value of the level counter is less than 3 (YES in step S1307), then in step S1308, the monitoring control unit 101 adds 1 to the level counter and updates the data in the consumables status data storage unit 107. For example, if the cyan toner illustrated in FIG. 12 which has a temporary level of level 2 is determined to have the same level 2 this time, then the cyan toner level counter is changed to level 2.

Next, in step S1309, the monitoring control unit 101 determines whether the value of the level counter equals 3. If the level counter is 3 (YES in step S1309), then in step S1310, the monitoring control unit 101 sets the temporary level as a correct toner level in the consumables status data storage unit 107. For example, if the magenta toner illustrated in FIG. 12, which has a temporary level of level 2, is determined to have the same level 2, then the magenta toner level counter is set to 3 in step S1308 and level 2 will be set as the magenta toner level in step S1310.

Following step S1310, processing similar to the first embodiment, such as the determination of level change based on the correct toner level performed in step S1006 of FIG. 10, will be performed.

According to the present embodiment, a level of the consumables is acquired several times at regular intervals and the subsequent status of the consumables is determined each time the level of the consumables is acquired. At that time, unless a same level as the temporary level is acquired for at least 3 times (i.e., threshold value is 3), the temporary level is not determined as the correct level. The number of times is not limited to 3, however the temporary level should be acquired for at least two times. For example, in a system where the level of the consumables is monitored every minute and, according to the service person's experience, a possibility of false detection becomes low when a level same as the temporary level is acquired approximately 10 times (10 minutes), the threshold value can be set to 10.

In the present embodiment, if an administrator sets in advance a threshold of the level counter which is environmentally appropriate, and the remaining amount of toner temporarily changes, the possibility of false detection can be reduced, and the current status of the remaining amount of toner can be appropriately detected.

According to the first and the second exemplary embodiments, thresholds which are set to 80% and 10% are used in determining a status level based on the consumption rate of the consumables. However, the threshold used for the determination may be different depending on the apparatus models. In a third exemplary embodiment of the present invention, a method for determining a threshold for each image forming apparatus will be described.

FIG. 14 illustrates apparatus status data and FIG. 15 illustrates a subsequent status table used in the present embodiment.

The apparatus status data includes the data used in the first embodiment, error information, etc. of the apparatus, and a threshold which is used for determining the status level. The threshold is provided for each of the consumables which are to be determined.

In the first embodiment, a fixed value is used for the subsequent status table. In the present embodiment, however, a value in which a threshold in the apparatus status data is subtracted from 100% is used for determining a level change from level 0 to level 1, and a threshold in the apparatus status data is used for determining a level change from level 1 to level 2.

Figure 16:
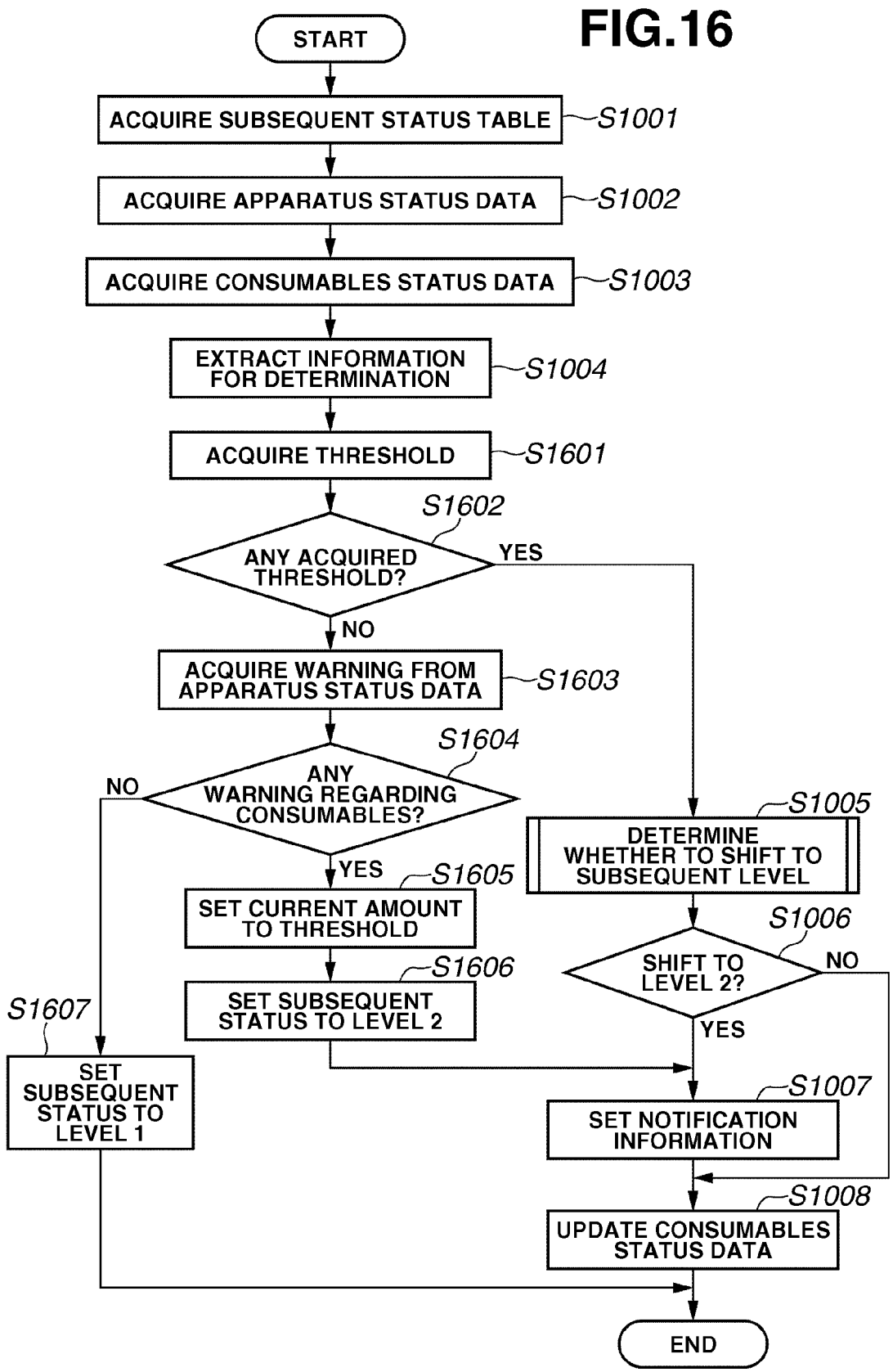
FIG. 16 is a flowchart illustrating a control program configured to confirm consumables status according to the third exemplary embodiment of the present invention.

FIG. 16 is a flowchart illustrating a control program configured to confirm the status of the consumables according to the present embodiment.

The apparatus editing processing and the apparatus monitoring processing of the present embodiment are similar to the processing illustrated in FIGS. 8 and 9. The processing illustrated in FIG. 10 is different in the confirmation processing of the status of the consumables, and the flowchart illustrated in FIG. 16 will be used in the present embodiment.

Since processes described in steps S1001 to S1008 are similar to those described in the first and the second embodiments, their description will be omitted herein and steps S1601 to S1607 which are unique to the present embodiment will be described.

In step S1601, subsequent to step S1004, the consumables status monitor unit 104 accesses the apparatus status data storage unit 106 and acquires information about the threshold.

In step S1602, the monitoring control unit 101 determines whether the threshold is set in the apparatus status data and is acquired. If the threshold is not acquired (NO in step S1602), then in step S1603, the monitoring control unit 101 detects, for example, a new image forming apparatus, etc. on the monitoring network. After registering information about the image forming apparatus, if a threshold is not yet determined, the monitoring control unit 101 refers to the apparatus status data storage unit 106 and acquires the warning information. In step S1604, the monitoring control unit 101 determines whether the warning information, such as toner low, of the consumables that are currently being checked is included in the acquired warning information.

If appropriate warning information is determined (YES in step S1604), then in step S1605, the monitoring control unit 101 sets the current remaining amount of toner as the threshold and sets the threshold in the apparatus status data storage unit 106. Subsequently, in step S1606, the monitoring control unit 101 sets the subsequent status level to level 2 and the process proceeds to step S1007. If appropriate warning information does not exist (NO in step S1604), then in step S1607, the monitoring control unit 101 sets the subsequent status level to level 1 and the process ends.

In step S1602, if the threshold is determined to exist (YES in step S1602), then in step S1005, the monitoring control unit 101 uses the threshold and determines the level of the subsequent status based on the subsequent status table. Next, the monitoring control unit 101 executes the processes in steps S1006 to S1008.

According to the present embodiment, a warning is issued using a warning number. A relation between the consumables and the warning number is described in the consumables status monitor unit 104 or in a file used in the consumables status monitor unit 104. Thus, the monitoring control unit 101 detects a warning of the consumables and acquires the threshold.

According to the present embodiment, monitoring and warning notification based on the status of the consumables corresponding to each model type become possible even when a model has a different threshold.

The first, the second, and the third exemplary embodiments use toner as an example of consumables. However, similar processing can be performed for, for example, glue or staple for bookbinding by detecting their remaining amount. Further, when one apparatus has a plurality of consumables, each of the consumables may be individually managed and processed.

According to the exemplary embodiments of the present invention, notification is sent when the status is changed to level 2. This is to inform the service person that the remaining amount of consumables is low so that the service person can deliver the consumables before they are used up. Further, the notification may be sent, for example, when the level is changed from level 2 to level 0, which means that the consumables are replaced and the inventory of the consumables is used. This notification (replacement notification) can be applied to a system in which consumables are replenished when the inventory is used.

The above-described exemplary embodiments can be realized by a system including a plurality of devices or an apparatus including a single device. The above-described exemplary embodiments can be realized in, for example, a printer, a fax machine, a personal computer, a computer system including a server and a client computer, etc.

The present invention includes a case where the functions of the above-described exemplary embodiments are realized when a software program is supplied to a system or an apparatus directly or from a remote location, and a computer of the system or the apparatus executes the supplied program code to realize the functions of the above-described exemplary embodiments.

Accordingly, where program code is installed in the computer and executed by the computer to realize the functions of the present invention, the program code itself also constitutes the present invention. In other words, the present invention includes a computer-executable program configured to realize the processing of the functions of the above-described exemplary embodiments.

In this case, the computer-executable program can be provided in the form of object code, a program executed by an interpreter, or script data supplied to an operating system, etc., if it functions as a program.

A recording medium used for supplying the program includes, for example, a floppy disk, a hard disk, an optical disk, a magneto-optical disc (MO), a compact disc read-only memory (CD-ROM), a compact disc-recordable (CD-R), a compact disc-rewritable (CD-RW), a magnetic tape, a non-volatile memory card, a read-only memory (ROM), a digital versatile disc (DVD) (a digital versatile disc read-only memory (DVD-ROM), and a digital versatile disc-recordable (DVD-R)).

The program can also be supplied to a user by connecting to an Internet website using a browser of a client computer and downloading the computer-executable program of the present invention into a recording medium, such as a hard disk. In this case, the program which is downloaded can be a compressed file having an automated install function. Further, the program code that constitutes the program of the exemplary embodiments of the present invention can be divided into a plurality of files and each file can be downloaded from different Internet websites. In other words, a World Wide Web (WWW) server which allows a plurality of users to download a program file to realize the functions of the above-described exemplary embodiments also constitutes the present invention.

Furthermore, the program of the present invention can be encrypted, recorded on a recording medium, such as a CD-ROM, and delivered to users. In this case, a user who satisfies a predetermined condition is allowed to download encryption key information from an Internet website via the Internet, to decrypt the encrypted program using the encryption key information, and installs the decrypted program on the computer.

The functions of the above-described exemplary embodiments are implemented when the provided program is executed by a computer. Additionally, the program can be used together with an operating system running on a computer to realize the functions of the above-described exemplary embodiments. In this case, the operating system performs the whole or a part of the actual processing.

Furthermore, the program read out from the recording medium can be stored in a memory equipped in a function expanding board or a function expanding unit connected to a computer to realize the whole or a part of the functions of the above-described exemplary embodiments. In this case, after the program is stored in the function expanding board or the function expanding unit, based on the instruction of the program, a CPU equipped in the function expanding board or the function expanding unit performs the whole or a part of the actual processing.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2007-037798 filed Feb. 19, 2007, which is hereby incorporated by reference herein in its entirety.

What is claimed is:

1. An information processing apparatus configured to monitor a status of consumables of an image forming apparatus, the information processing apparatus comprising:
   a storage unit configured to store the status of the consumables of the image forming apparatus;
   an acquisition unit configured to acquire a consumption rate of the consumables of the image forming apparatus;
   a determination unit configured to determine a subsequent status of the consumables based on the status of the consumables stored in the storage unit and the consumption rate acquired by the acquisition unit, wherein the status of the consumables includes a first status, a second status, and a third status, wherein the second status has a remaining amount of the consumables less than the first status and the third status has a remaining amount of consumables less than the second status;
   a notification unit configured to notify that the remaining amount of the consumables is low when the subsequent status of the consumables is determined to be the third status by the determination unit; and
   a replacement notification unit configured to notify that the consumables have been replaced when the subsequent status of the consumables is determined to be the first status by the determination unit,
   wherein when the status of the consumables stored in the storage unit is the third status, the determination unit determines that the subsequent status of the consumables is the first status if the consumption rate acquired by the acquisition unit is greater than or equal to a second threshold, and determines that the subsequent status of the consumables is not the second status but the third status if a consumption rate acquired by the acquisition unit is greater than or equal to the first threshold but less than the second threshold.

2. The information processing apparatus according to claim 1, wherein when the consumables stored in the storage unit is in the first status, the determination unit does not determine that the subsequent status of the consumables is the third status, and determines that the subsequent status of the consumables is the second status if the consumption rate acquired by the acquisition unit equals to or exceeds the first threshold but is less than the second threshold, and wherein when the consumables stored in the storage unit is in the second status, the determination unit does not determine that the subsequent status of the consumables is the first status, and determines that the subsequent status of the consumables is the third status if the consumption rate acquired by the acquisition unit is less than the first threshold.

3. The information processing apparatus according to claim 1, wherein when the determination unit determines that the status of the consumables stored in the storage unit and the subsequent status of the consumables are different, the subsequent status of the consumables is set as the status of the consumables stored in the storage unit.

4. The information processing apparatus according to claim 1, wherein when the acquisition unit acquires the consumption rate a plurality of times and the determination unit determines the subsequent status of the consumables based on the status of the consumables stored in the storage unit and the acquired consumption rate, if the status of the consumables stored in the storage unit and the subsequent status of the consumables are different, and if the determination unit determines at least two times that the subsequent status of the consumables is the same status, the subsequent status of the consumables is set as the status of the consumables stored in the storage unit.

5. The information processing apparatus according to claim 4, further comprising a temporary storage unit configured to temporarily store the subsequent status of the consumables which is determined by the determination unit based on the status of the consumables stored in the storage unit and the acquired consumption rate.

6. The information processing apparatus according to claim 4, further comprising a notification unit configured to notify that the remaining amount of the consumables is low when the subsequent status of the consumables which is set as the status of the consumables stored in the storage unit is the third status.

7. The information processing apparatus according to claim 1, wherein the consumption rate acquired by the acquisition unit is set as the second threshold.

8. A method for an information processing apparatus configured to monitor a status of consumables of an image forming apparatus, the method comprising:

storing the status of the consumables of the image forming apparatus;

acquiring a consumption rate of the consumables of the image forming apparatus;

determining a subsequent status of the consumables based on the status of the stored consumables and the acquired consumption rate, wherein the status of the consumables includes a first status, a second status, and a third status, wherein the second status has a remaining amount of the consumables less than the first status, and the third status has a remaining amount of consumables less than the second status;

notifying that the remaining amount of the consumables is low if the subsequent status of the consumables is determined to be the third status; and notifying that the consumables have been replaced if the subsequent status of the consumables is determined as the first status, wherein when the stored consumables is in the third status, determining that the subsequent status of the consumables is not the second status but the third status if the acquired consumption rate equals to or exceeds the first threshold but less than the second threshold, and determining that the subsequent status of the consumables is the first status if the acquired consumption rate is greater than or equal to the second threshold.

9. The method according to claim 8, further comprising:

when the stored consumables is in the first status, not determining that the subsequent status of the consumables is the third status, and determining that the subsequent status of the consumables is the second status if the acquired consumption rate equals to or exceeds the first threshold but is less than the second threshold; and when the stored consumables is in the second status, not determining that the subsequent status of the consumables is the first status, and determining that the subsequent status of the consumables is the third status if the acquired consumption rate is less than the first threshold.

10. The method according to claim 8, further comprising storing the subsequent status of the consumables as the status of the consumables if the status of the stored consumables and the subsequent status of the consumables are determined to be different.

11. The method according to claim 8, further comprising, when acquiring the consumption rate a plurality of times and determining the subsequent status of the consumables based on the status of the stored consumables and the acquired consumption rate, if the status of the stored consumables and the subsequent status of the consumables are different, and if the determination unit determines at least two times that the subsequent status of the consumables is the same status, the subsequent status of the consumables is set as the status of the consumables.

12. The method according to claim 11, further comprising temporarily storing the subsequent status of the consumables which is determined based on the status of the stored consumables and the acquired consumption rate.

13. The method according to claim 11, further comprising notifying that the remaining amount of the consumables is low if the subsequent status of the consumables which is set as the status of the consumables, is the third status.

14. A control program stored in a recording medium, the control program configured to cause a computer to monitor a status of consumables in an image forming apparatus, the method comprising:

storing the status of the consumables of the image forming apparatus;

acquiring a consumption rate of the consumables of the image forming apparatus;

determining a subsequent status of the consumables based on the status of the stored consumables and the consumption rate, wherein the status of the consumables includes a first status, a second status, and a third status, wherein the second status has a remaining amount of the consumables less than the first status and the third status has a remaining amount of consumables less than the second status;

notifying that the remaining amount of the consumables is low if the subsequent status of the consumables is determined to be the third status; and notifying that the consumables have been replaced if the subsequent status of the consumables is determined as the first status;

wherein when the stored consumables is in the third status, determining that the subsequent status of the consumables is the first status if the acquired consumption rate is greater than or equal to the second threshold and determining that the subsequent status of the consumables is not the second status but the third status if the acquired consumption rate is greater than or equal to the first threshold but less than the second threshold.

* * * * *